July 18, 1950     A. H. PICHLER     2,515,260
COMBINED TAP AND VALVE
Filed Nov. 15, 1945
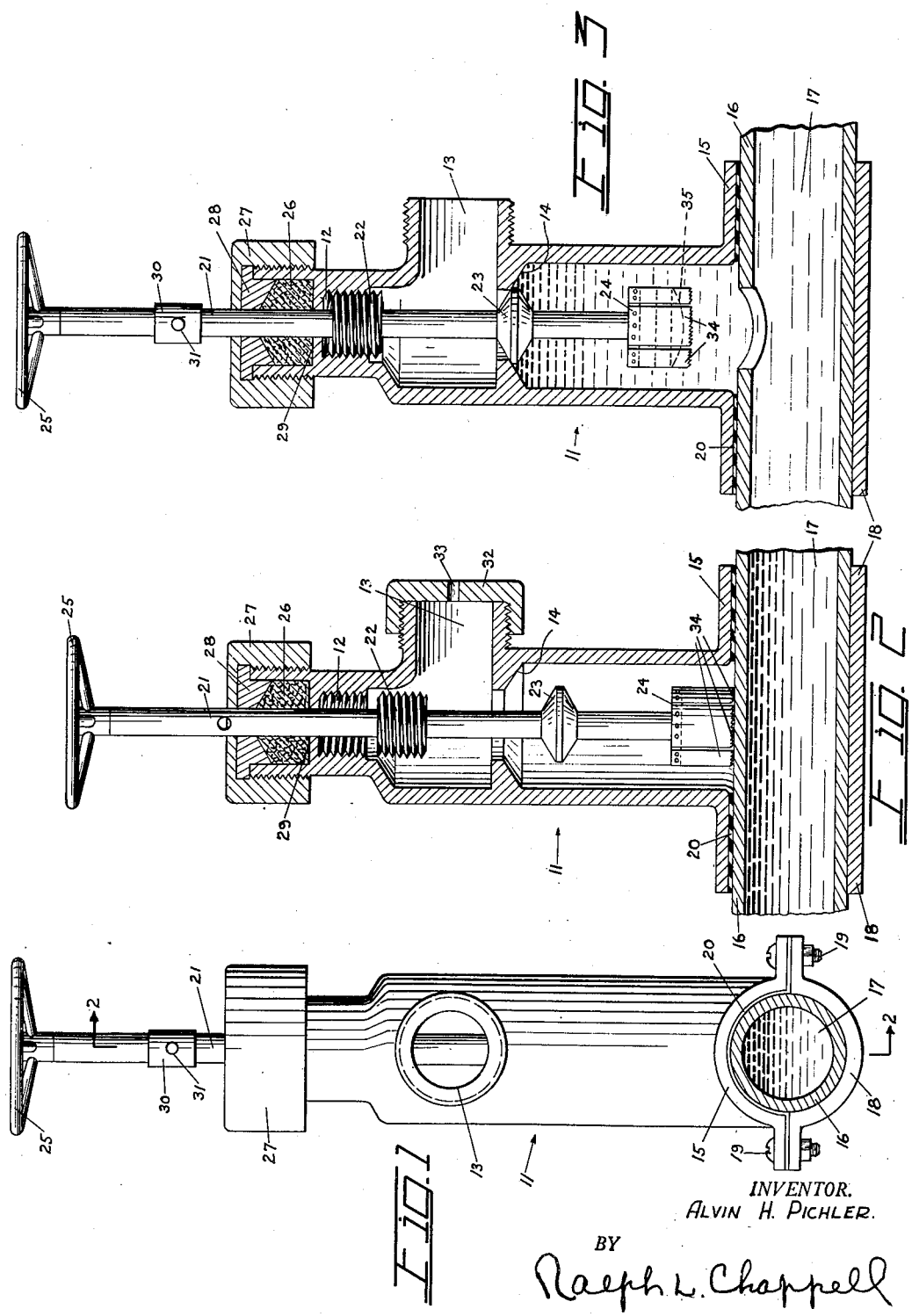
INVENTOR.
ALVIN H. PICHLER.
BY
Ralph L. Chappell
ATTORNEY.

Patented July 18, 1950

2,515,260

UNITED STATES PATENT OFFICE 2,515,260

COMBINED TAP AND VALVE

Alvin H. Pichler, Miami, Fla.

Application November 15, 1945, Serial No. 628,954

3 Claims. (Cl. 137—73)

(Granted under the act of March 3, 1883, as amended April 30, 1928; 370 O. G. 757)

This invention relates to a combination tap and valve, and has as an object the provision of a valve that can be clamped to a conduit at any location to provide a new outlet.

Another object is to provide a valve that is capable of making a new outlet in a closed conduit.

Still another object is to provide a valve that is capable of making a new outlet in a conduit while such conduit is filled with fluid under pressure.

A further object is to provide a valve that can be affixed to a fluid-carrying conduit without interrupting the flow of fluid through said conduit.

Another object is to provide a valve that can be quickly and easily affixed to any section of a fluid-carrying conduit without disassembly and insertion of special fittings.

Further objects and advantages of this invention, as well as its construction, arrangement and operation, will be apparent from the following description and claims in connection with the accompanying drawing, in which, Fig. 1 is a side elevation of the valve of this invention, affixed to a fluid-carrying conduit.

Fig. 2 is a longitudinal section, partly in elevation, taken along the line 2—2 of Fig. 1, the valve being shown in cutting relationship with the conduit to which it is affixed, and Fig. 3 is a longitudinal section similar to Fig. 2, the valve being shown in final operative form.

The valve comprises a valve body 11, provided with an internal threaded portion 12, an outlet opening 13, an internal integral seat 14, and a semi-cylindrical flange portion 15. Seat 14 is located between the outlet opening 13 and the flange portion 15. The flange portion 15 partially encloses a conduit 16, filled with a fluid 17, which may be under pressure.

A semi-cylindrical flanged retainer 18 encloses conduit 16 in conjunction with flange portion 15, and is securely affixed to flange portion 15 by bolts 19. A gasket 20 is provided adjacent the areas of flange portion 15 which bear upon conduit 16 and retainer 18.

Within body 11 and extending from the outer end thereof is a valve stem 21. Valve stem 21 is provided with a worm 22 which is adapted to threadably engage threaded portion 12, a disc 23 which is adapted to seat upon the inner side of seat 14, and a cutter head 24. The outer end of stem 21 is adapted to be engaged by rotary power tools or by similar means such as wheel 25 adapted to impart axially rotative motion thereto.

The passage of stem 21 through the outer end of body 11 is proofed against fluid leakage by packing 26. Retaining cap 27 and collar 28 retain packing 26 against stop 29. Stop 29 terminates threaded portion 12 at its outer end, and limits the movement of worm 22 when in engagement therewith.

Sleeve 30 may enclose the protruding end of stem 21, being affixed thereto by pin 31, to prevent disengagement of worm 22 from threaded portion 12 during normal operation of the valve. Cap 32, provided with a drilled hole 33 therethrough, may close outlet opening 13 during the attachment of the valve to conduit 16 and the cutting of an outlet opening therein.

Cutter head 24 is provided with a plurality of cutters 34, projecting outwardly from cutter head 24 and positioned and adapted to cut a circular hole in the adjacent surface of conduit 16 as stem 21 is rotated. Cutters 34 may be of any type capable of cutting through the wall of conduit 16, short sections of hack-saw blade affixed to the periphery of cutter head 24 being suitable except when the wall thickness of conduit 16 is relatively great. Cutters 34 are preferably flexible, adapted and arranged to contain and retain plug 35, cut from conduit 16 (Fig. 3).

The valve of this invention is utilized in the following manner. At any point in a fluid-carrying conduit at which a new outlet is desired, the valve is affixed by placing gasket 20 and flanged portion 15 of valve body 11 in contact with the conduit. Retainer 18 is then placed in contact with the conduit opposite flanged portion 15, and flanged portion 15 is caused to bear heavily upon gasket 20 and the conduit 16 by tightening the bolts 19.

Valve stem 21 and worm 22 are then screwed out of engagement with threaded portion 12, whereby stem 21 is freed to move longitudinally within body 11, and cutters 34 are brought into contact with conduit 16. Cutter head 24 is then caused to rotate by a handwheel 25, or by any suitable power means, and the cutters 34 to work upon conduit 16 until plug 35 has been cut therefrom. The flexibility of the cutters 34, in conjunction with the curved exterior of conduit 16 on which they work cause cutters 34 to spread outwardly, so that when plug 35 has been completely cut it will be held within cutters 34 by frictional engagement, and thus will not be left as a loose impediment within conduit 16 or valve body 11.

It is not necessary to interrupt the flow of fluid through conduit 16 during this operation. If fluid is flowing through conduit 16, outlet opening 13 can be closed by cap 32, to prevent loss of fluid therethrough. Hole 33 is in cap 32 to permit escape of a small stream of fluid, sufficient to carry away the chips resulting from the cutting of an outlet in conduit 16 (Fig. 2).

When plug 35 has been cut from conduit 16, valve stem 21 and worm 22 are moved longitudinally until worm 22 encounters threaded portion 12, and worm 22 can then be threaded into engagement with threaded portion 12 until disc 23 seats upon seat 14. Cap 32 is removed and a permanent pipe, flexible hose, or similar conduit, not shown, is connected to outlet opening 13 if desired. Sleeve 30 is affixed to the extending end of stem 21, as by pin 31, and is so positioned as to prevent disengagement of worm 22 with threaded portion 12 by contact with retaining cap 27. The valve is now ready to operate as any ordinary valve, passage of fluid therethrough being controlled by wheel 25.

The valve of this invention permits the creation of a new outlet in a conduit without stopping the flow of fluid therethrough. The necessity of shutting down operations, with consequent loss of time and fluid, is eliminated, as is the time necessary to cut the conduit and insert fittings. Furthermore, the valve can be affixed to conduits that are curved or coiled or that may be in difficultly accessible locations. The valve of this invention can be adapted to be affixed to conduits of any diameter, wall thickness or material.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A combined tap and valve comprising a body having an outlet opening therein, means for clamping one end of said body to the exterior of a conduit, a stem within said body and extending from the opposite end thereof, said stem being threadably engageable to said body, means on said stem positioned and adapted to open and close said outlet opening when said stem is in threaded engagement with said body, and cutting means affixed to the inner end of said stem, said means being positioned and adapted to be held in spaced relationship from said conduit when said stem is threadably engaged to said body and to be brought into cutting relationship with said conduit when the threads on the stem are disengaged from said body.

2. A combined tap and valve comprising a body having an outlet opening therein, means for clamping one end of said body to the exterior of a conduit, a stem within said body and extending from the opposite end thereof, said stem being threadably engageable to said body, a seat in said body between the outlet opening and the conduit, a disc on said stem positioned and adapted to be moved into and out of engagement with said seat when said stem is in threaded engagement with said body, said disc when in engagement with said seat cutting off communication between the outlet opening and the conduit, and rotary cutting means affixed to the inner end of said stem, said cutting means being positioned and adapted to be held in spaced relationship from said conduit when said stem is threadably engaged to said body and to be brought into cutting relationship with said conduit when the threads on the stem are disengaged from said body.

3. A combined tap and valve comprising a body having an outlet opening therein, means for clamping one end of said body to the exterior of a conduit, a stem within said body and extending from the opposite end thereof, said stem being threadably engageable to said body, a seat in said body between the outlet opening and the conduit, a disc on said stem positioned and adapted to be moved into and out of engagement with said seat when said stem is in threaded engagement with said body, said disc when in engagement with said seat cutting off communication between the outlet opening and the conduit, and resilient rotary cutting means affixed to the inner end of said stem, said cutting means being positioned and adapted to be held in spaced relationship from said conduit when said stem is threadably engaged to said body and to be brought into cutting relationship with said conduit when the threads in the stem are disengaged from said body, and being adapted to resiliently retain a section cut from said conduit.

ALVIN H. PICHLER.

REFERENCES CITED

The following references are of record in the file of this patent:

UNITED STATES PATENTS

| Number | Name | Date |
|---|---|---|
| 455,890 | Smith | July 14, 1891 |
| 463,524 | Madden | Nov. 17, 1891 |
| 1,743,338 | Field | Jan. 14, 1930 |
| 1,938,984 | Smith | Dec. 12, 1933 |

FOREIGN PATENTS

| Number | Country | Date |
|---|---|---|
| 468,538 | Germany | June 25, 1927 |

Certificate of Correction

July 18, 1950

Patent No. 2,515,260

ALVIN H. PICHLER

It is hereby certified that error appears in the printed specification of the above numbered patent requiring correction as follows:

Column 4, line 10, strike out the word "rotary";

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*